Nov. 25, 1947.  F. K. McCUNE  2,431,575
SCREEN BRIGHTNESS MEASUREMENT PHOTOMETER
Filed March 18, 1946
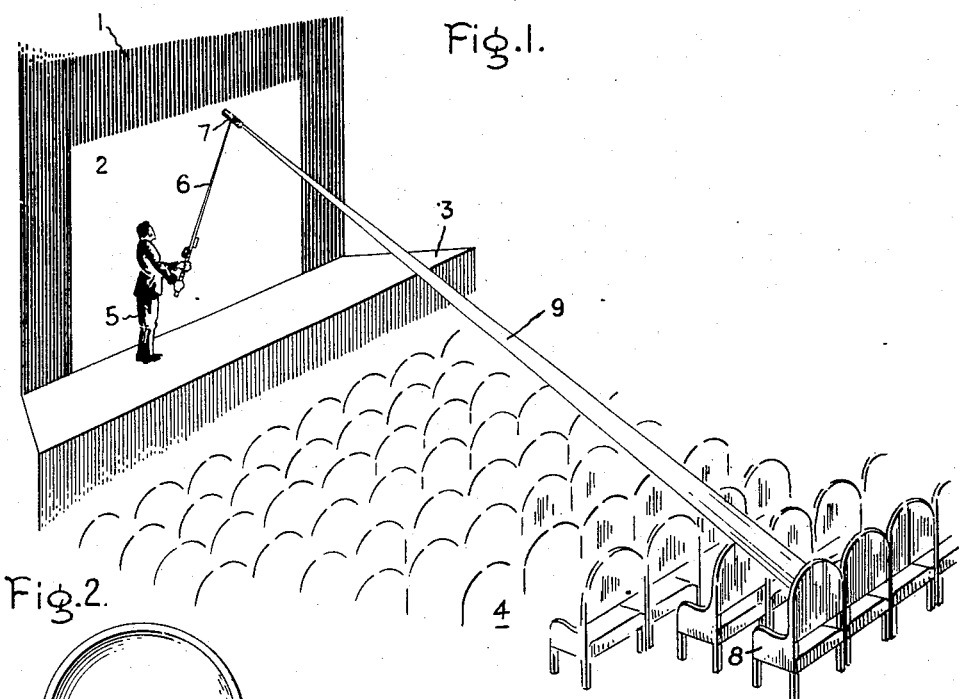
Fig.1.
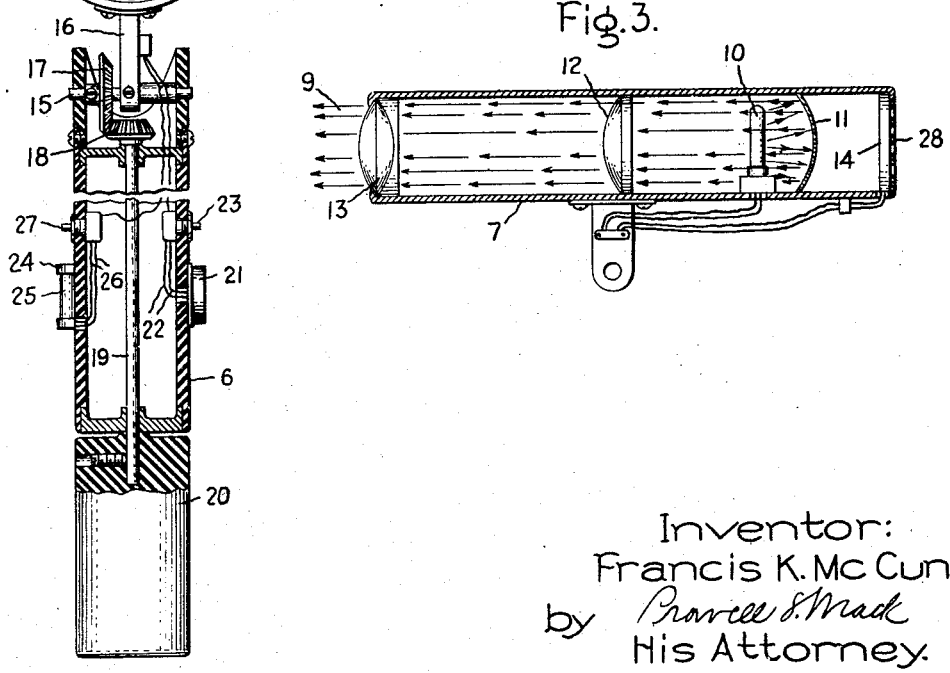
Fig.2.
Fig.3.
Inventor:
Francis K. McCune,
by Prowell S. Mack
His Attorney.

Patented Nov. 25, 1947

2,431,575

UNITED STATES PATENT OFFICE 2,431,575

SCREEN BRIGHTNESS MEASUREMENT PHOTOMETER

Francis K. McCune, Marblehead, Mass., assignor to General Electric Company, a corporation of New York Application March 18, 1946, Serial No. 655,290

3 Claims. (Cl. 88—23)

My invention relates to apparatus for measuring the brightness of objects from any desired viewing point, and the particular use described is for measuring the brightness of different parts of a motion picture screen from various seats or viewing points in a theater. Such information is useful in order to obtain the desired uniformity and intensity of brightness from all viewing points.

It would be possible for a person equipped with the necessary brightness measuring equipment to obtain this information by measuring the brightness of a motion picture screen located on the stage, from various points about the theater, by taking his equipment to such various points and obtaining the measurements. This would be somewhat laborious and time-consuming and becomes unnecessary with the use of my invention. I take advantage of the fact that the brightness of an object, such as a motion picture screen, is independent of the distance from which the screen is viewed and obtain the measurements at the screen itself. In order to ascertain the distant viewing points for the various measurements, I make use of a brightness measuring unit equipped with a pointer in the form of a pencil of light which at all times shows the direction from which the measurement is taken and indicates the distant viewing point at the time of measurement.

The features of my invention which are believed to be novel and patentable will be pointed out in the claims appended hereto. For a better understanding of my invention, reference is made in the following description to the accompanying drawing in which Fig. 1 illustrates the manner of use of my invention in a theater; Fig. 2 is a partly sectioned view of one form of my portable brightness measuring and viewpoint locator combination showing means for conveniently adjusting the measuring direction or angle; and Fig. 3 is a cross-sectional view of the combined brightness measuring cell and light pointer used in the apparatus.

In Fig. 1 there is represented a motion picture screen 1 having an illuminated area 2 located on a stage 3 of a theater. A portion of the seats in the orchestra section 4 is also indicated. It is assumed that the screen is illuminated from the back. However, the illuminating projector could be located either back of the screen or at the front with the light being projected from a point above and to the rear of the seats. An operator 5 is shown on the stage equipped with one of my combined brightness and direction indicating equipments 6—7, represented as measuring the brightness of the screen from various viewpoints about the theater. As shown, the operator is measuring the brightness of an upper right portion of the screen as viewed from the seat designated 8, the beam of light 9 indicating the direction and illuminating the point, namely seat 8, from which the measurement is being taken.

The measuring equipment comprises a tubular container 7 located on a pole 6. In the tubular container is an incandescent lamp 10 (see Fig. 3) combined with a reflector 11 and suitable projecting lenses 12 and 13 for projecting a pencil beam of light axially from one end of the container 7. This is the beam of light indicated at 9 in Fig. 1. In the opposite end of the container is a photo-voltaic light sensitive measuring cell 14 with its light receiving surface facing outwardly or in the opposite axial direction to that in which the light beam 9 is projected. The container 7 is located on the upper end of a suitable pole 6 in order that the part 7 may be easily extended adjacent to any point of the screen 1. The container 7 is also preferably hinged at the upper end of the pole, so that its angle to the pole may be readily changed. Thus container 7 is secured to a shaft 15 by a bracket 16, and the shaft 15 which is pivoted at the upper end of pole 6, may be turned through gears 17 and 18 and a shaft 19 secured into a rotary lower section 20 of the handle end of the pole.

On the pole is an electrical measuring instrument 21 calibrated in suitable brightness units and connected by wiring 22 through a switch 23 to the cell 14. The instrument 21 is placed so as to be easily read by the operator. Also, preferably secured to the pole by suitable clips 24 is a storage battery 25 connected to the lamp 10 through wiring 26 and a switch 27. The wiring between the switches and container 7 may be contained within the hollow pole. The lamp energizing circuit carried by the pole could of course be arranged to be energized from any existing source of supply, such as an outlet in the lighting circuit of the theater. The light from the screen reaches the cell 14 preferably through a light directing grid represented at 28, so that only light from a direction substantially at right angles to the cell and in the same axis as the projected light beam 9 is effective in producing a measurement.

It is now seen that the device as pictured in Fig. 1 is measuring the brightness of that section of the screen opposite the cell end of container 7 as it would appear if seen by a person sitting in seat 8. The brightness of any other section or point on the screen can be measured from the same point of view, namely seat 8, by exposing cell 10 to such section or spot and keeping the pencil of light 9 on seat 8. Then the point of view may be changed, for instance, to a seat in the balcony by pointing the pencil of light 9 to such balcony seat and continuing with the brightness survey of the screen. Thus the brightness of all parts of the screen may be measured from any point in the theater from which the screen may be seen without the operator leaving the stage.

It may be pointed out also that if suitable measuring equipment were carried around the theater to take the measurements, it would be much more difficult to confine any particular measurement to a selected spot or section of the screen because of the divergence of light rays with distance, and the measurement would be more nearly that of a general brightness measurement of the screen as a whole rather than measurements of selected sections thereof from which uniformity as well as intensity may be gauged.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. Brightness measuring apparatus comprising a container having a light projecting system for projecting a pencil beam of light in one direction from said container, and a light sensitive cell arranged to receive light rays from the opposite direction relative to said container, a measuring instrument connected to said cell, and means for energizing said light projecting system.

2. Light responsive and direction indicating apparatus comprising a portable container containing a light sensitive cell arranged to be influenced by parallel light rays from a given direction outside said container, and means for projecting a pencil-like light beam from said container in the opposite direction relative to said container and along the same axis as the received light rays in order to indicate the direction toward which the parallel light rays would be directed if not intercepted by said light cell.

3. Brightness measuring apparatus comprising a container containing a light sensitive cell arranged to receive and be influenced by light rays from a given direction outside of said container, a lamp in said container and a light projecting system associated therewith for projecting a pencil-like beam of light in the opposite direction from said container and in line with the light rays received by the cell, a pole supporting said container at one end thereof, means carried by said pole for changing the angle at which the container is supported thereon, an electrical measuring instrument carried on said pole and connected to said cell, and an electric circuit having a switch therein carried by said pole for energizing said lamp.

FRANCIS K. McCUNE.

REFERENCES CITED

The following references are of record in the file of this patent:

UNITED STATES PATENTS

| Number | Name | Date |
| --- | --- | --- |
| 1,546,264 | Story, Jr. | July 14, 1925 |
| 2,128,526 | Eslick | Aug. 30, 1938 |
| 2,137,548 | Strauss | Nov. 22, 1938 |
| 2,386,816 | Scholz | Oct. 16, 1945 |